A. F. BUCHANAN.

MANUFACTURE OF OIL CLOTH.

No. 10,462. Reissued Apr. 1, 1884.

WITNESSES:

William Miller

Chas Wahlers

INVENTOR

Alexander F. Buchana

BY Van Santvoord & Hauff his ATTORNEYS

UNITED STATES PATENT OFFICE.

ALEXANDER F. BUCHANAN, OF MONTROSE, NEW YORK.

MANUFACTURE OF OIL-CLOTH

SPECIFICATION forming part of Reissued Letters Patent No. 10,462, dated April 1, 1884.

Original No. 276,765, dated May 1, 1883. Application for reissue filed March 3, 1884.

*To all whom it may concern:*

Be it known that I, ALEXANDER F. BUCHANAN, a citizen of the United States, residing at Montrose, in the county of Westchester and State of New York, have invented certain new and useful Improvements in the Manufacture of Oil-Cloth, of which the following is a specification.

This invention consists in the novel process and apparatus, hereinafter described, for decorating oil-cloth in imitation of wainscoting, and also in the article thus obtained as a new manufacture.

Figure 1:
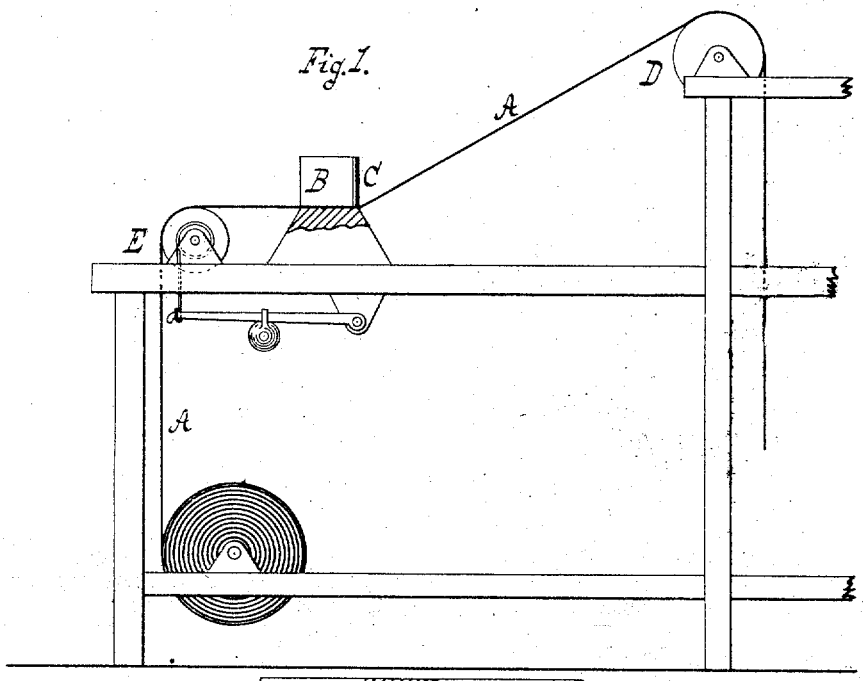
Figure 2:
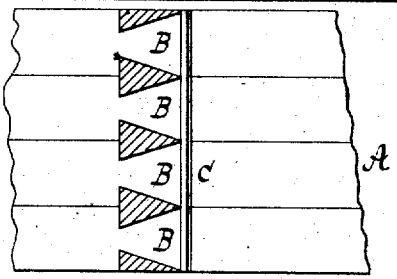
Figure 3:
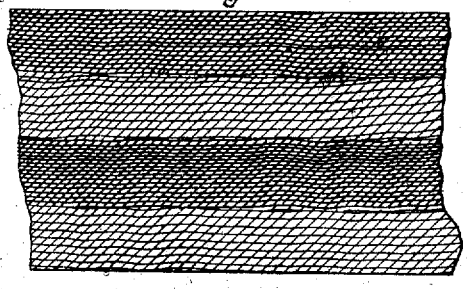

In the accompanying drawings, Figure 1 represents a sectional side elevation of the apparatus used in carrying out my invention. Fig. 2 is a sectional plan view of the daubing-troughs. Fig. 3 shows a piece of the oil-cloth.

Similar letters indicate similar parts.

In carrying out my invention I expose a traveling web, A, of cloth to the action of a series of daubing devices, B, which are supplied with colors of different shades, so that the web becomes coated with such colors in parallel lines or sections corresponding in width to the daubing devices. I then dry the colors and grain the entire coated surface of the web, by a suitable color or colors, in imitation of wood. I then dry the graining-color and varnish the coated and grained surface, when the cloth is ready for use. It will be seen that by this process, which is an extremely simple and cheap one, I impart to the surface of the cloth the appearance of strips of wood of different shades, as in wainscoting, which renders the article highly useful for paneling and other purposes, it also possessing the important feature of being readily cleaned.

The daubing devices B consist of troughs which are open at the bottom and arranged side by side, so that the colors that may be contained in the troughs escape therefrom in a downward direction, and are applied to the cloth by simply passing the web under the troughs. Each of said troughs B is expanded in a horizontal plane toward the rear edge, where the troughs meet, as shown in Fig. 2, so that the lines or divisions produced on the web are separated from each other at the junctions of the troughs in sharp and clearly-defined lines, the widths of said lines being equal to the widest parts of said troughs, which in this example correspond to each other. On the rear edge of the daubing-troughs B is arranged a blade, C, which acts as a "doctor" to spread the colors, which are deposited on the cloth in an even layer—such blade being common to the series of troughs.

For the purpose of impelling the web of cloth I make use of a drag-roller, D, which is above the horizontal plane of the troughs; and to guide the web under the troughs I employ a roller, E, which is also a brake-roller, and counteracts the drag-roller.

What I claim as new, and desire to secure by Letters Patent, is—

1. The within-described process for decorating oil-cloth, which consists in exposing a traveling web of cloth to the action of a series of daubing devices containing colors of different shades, thus coating the web in parallel lines or sections with such colors, then drying the colors and graining the entire coated surface of the web, by a suitable color, in imitation of wood, then drying the graining-color, and finally varnishing the coated and grained surface.

2. The open-bottom daubing-troughs arranged side by side, and each expanded horizontally toward the rear edge, where the troughs meet, in combination with the spreading-blade common to the series of troughs, and suitable rollers for guiding and impelling a web of cloth under said troughs and blade.

3. As a new or improved article of manufacture, the oil-cloth herein described, having its surface decorated in imitation of strips of wood of different shades.

In testimony whereof I have hereunto set my hand and seal in the presence of two subscribing witnesses.

ALEXANDER F. BUCHANAN. [L. S.]

Witnesses:
W. HAUFF,
E. F. KASTENHUBER.